United States Patent
O'Neill

(10) Patent No.: US 7,020,465 B2
(45) Date of Patent: Mar. 28, 2006

(54) CONTROLLING HAND-OFF IN A MOBILE NODE WITH TWO MOBILE IP CLIENTS

(75) Inventor: Alan O'Neill, Henley Beach (AU)

(73) Assignee: Flarion Technologies, Inc., Bedminster, NJ (US)

( * ) Notice: Subject to any disclaimer, the term of this patent is extended or adjusted under 35 U.S.C. 154(b) by 260 days.

(21) Appl. No.: 10/358,109

(22) Filed: Feb. 4, 2003

(65) Prior Publication Data

US 2004/0023653 A1 Feb. 5, 2004

Related U.S. Application Data

(60) Provisional application No. 60/354,195, filed on Feb. 4, 2002.

(51) Int. Cl.
*H04B 7/15* (2006.01)

(52) U.S. Cl. .................................. 455/432.1; 455/433

(58) Field of Classification Search ............. 455/432.1, 455/432.3, 422.1, 456.1, 11.1, 433, 435.1, 455/436–439; 370/331, 332
See application file for complete search history.

(56) References Cited

U.S. PATENT DOCUMENTS

| | | | |
|---|---|---|---|
| 4,833,701 A | 5/1989 | Comroe et al. | |
| 5,267,261 A | 11/1993 | Blakeney, II et al. | |
| 5,491,835 A | 2/1996 | Sasuta et al. | |
| 5,572,528 A | 11/1996 | Shuen | |
| 5,594,948 A | 1/1997 | Talarmo et al. | |
| 5,901,362 A | 5/1999 | Cheung et al. | |
| 6,006,090 A * | 12/1999 | Coleman et al. .......... | 455/432.1 |
| 6,097,966 A * | 8/2000 | Hanley ...................... | 455/555 |
| 6,144,671 A | 11/2000 | Perinpanathan et al. | |
| 6,161,008 A | 12/2000 | Lee et al. | |
| 6,195,705 B1 | 2/2001 | Leung | |
| 6,256,300 B1 | 7/2001 | Ahmed et al. | |
| 6,298,234 B1 * | 10/2001 | Brunner ................... | 455/432.1 |
| 6,308,267 B1 | 10/2001 | Gremmelmaier | |
| 6,366,561 B1 | 4/2002 | Bender | |
| 6,434,134 B1 | 8/2002 | La Porta et al. | |
| 6,446,127 B1 | 9/2002 | Schuster et al. | |
| 6,449,234 B1 * | 9/2002 | Ahn et al. .................. | 720/619 |
| 6,466,964 B1 | 10/2002 | Leung et al. | |
| 6,611,547 B1 | 8/2003 | Rauhala | |
| 6,763,007 B1 | 7/2004 | La Porta et al. | |

(Continued)

FOREIGN PATENT DOCUMENTS

JP 11-4311 1/1999

(Continued)

OTHER PUBLICATIONS

Karagiannis, Mobile IP, State of the Art Report, pp. 1-63, Jul. 1999.

(Continued)

*Primary Examiner*—CongVan Tran
(74) *Attorney, Agent, or Firm*—Straub & Pokotylo; Michael P. Straub

(57) ABSTRACT

Extending Mobile IP to support both local and remote access by using two MIP client stacks in the end node, a roaming Node in the local access network, a standard Home Agent in the remote network. Messages between the AR and the MN, and between the internal modules of the MN, are then used to control hand-off for each MIP client and to enable backwards compatibility with legacy remote access clients.

20 Claims, 6 Drawing Sheets

U.S. PATENT DOCUMENTS

| | | | |
|---|---|---|---|
| 6,862,446 | B1 | 3/2005 | O'Neill et al. |
| 2001/0041571 | A1 | 11/2001 | Yuan et al. |
| 2002/0015396 | A1 | 2/2002 | Jung |
| 2002/0026527 | A1 | 2/2002 | Das et al. |
| 2002/0068565 | A1 | 6/2002 | Purnadi et al. |
| 2002/0136226 | A1 | 9/2002 | Christoffel et al. |
| 2002/0191593 | A1 | 12/2002 | O'Neill et al. |
| 2003/0012179 | A1 | 1/2003 | Yano et al. |
| 2003/0176188 | A1 | 9/2003 | O'Neill |
| 2003/0214922 | A1 | 11/2003 | Shahrier |
| 2003/0228868 | A1 | 12/2003 | Turanyi et al. |
| 2004/0018841 | A1 | 1/2004 | Trossen |

FOREIGN PATENT DOCUMENTS

| | | |
|---|---|---|
| JP | 11-15737 | 1/1999 |
| JP | 11-146308 | 5/1999 |
| WO | WO 95/12297 | 5/1995 |
| WO | WO 98/47302 | 10/1998 |

OTHER PUBLICATIONS

Ho, Integration AAA with Mobile IPv4, Internet Draft, pp. 1-59, Apr. 2002.

PCT International Search Report for International Application No. PCT/US03/03336, filed on Feb. 4, 2003.

C. Perkins, Editor "IP Mobility Support", Network Working Group, pp. 1-79 (Oct. 1996).

Li, Yalun "Protocol Architecture for Universal Personal Computing" IEEE Journal on Selected Areas in Communications 15(8): 1467-1476 (1997).

IETF, Network Working Group, Request for Comments: 2205, Resource Reservation Protocol (RSVP)—Version 1 Functional Specification, pp. 1-105 (Sep. 1997).

IETF, Network Working Group, Request for Comments: 2206, RSVP Management Informatin Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2210, The Use of RSVP with IETF Integrated Services, pp. 1-31 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

J. Moy, Editor, "OSPF Version 2", Network Working Group, pp. 1-244 (Apr. 1998).

Valko, Andras "Cellular IP: A New Approach to Internet Host Mobility" Computer Communications Review 29(1): 50-65 (1999).

Andras G. Valko, "Cellular IP—A New Approach to Internet Host Mobility," ACM Computer Communication Review, Vol. 29, No. 1, pp. 50-65, Jan. 1999.

TIA/EIA/IS-707A.8 "Data Service Options for Spread Spectrum Systems: Radio Link Protocol Type 2" pp. 1-1:4: 12 (Mar. 1999).

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pps. 1-27 (Copyright 2001 by ETRI).

IETF Network Working Group, Request for Comments: 2961, RSVP Refresh Overhead Reduction Extensions, pp. 1-32 (Apr. 2001).

Marshall, W., et al., Integration of Resource Management and SIP, IETF Internet Draft, draft-ietf-sip-manyfolks-resource-02.txt, Aug. 2001, pp. 1-28.

Andrew T. Campbell et al., "IP Micro-Mobility Protocols", ACM Sigmobile Mobile Computer and Communication Review (MC2R), vol. 4, No. 4, pp. 34-54, Oct. 2001.

S. Zhou et al., "A Location Management Scheme for Support Mobility In Wireless IP Networks Using Session Initiation Protocol (SIP)", 1531-2216/01 IEEE, Oct. 2001, pp. 486-491.

Bos, L., et al., A Framework for End-to-End Perceived Quality of Service Negotiation, IETF Internet Draft, draft-bos-mmusic-sdpqos-framework-00.txt, Nov. 2001, pp. 1-22.

Papalilo, D., et al., Extending SIP for QoS Support www.coritel.it/publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002 pp. 1-18.

"SIP: Session Initiation Protocol", IEFT Network Wording Group, Request for Comments: 3261, (Jun. 2002), pps 1-29.

IETF, Network Working Group, Request for Comments: 3261 "SIP: Session Initiation Protocol", pp. 1-269 (printed as pp. 1-252) (Jun. 2002).

NetworkWorking Group, IPv6 Prefix Delegation Using ICMPv6, pps 1-33, Apr. 2004.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support for IPv4", C. Perkins, Ed., Nokia Research Center, Jan. 2002, downloaded from http://www.ietf.org on Dec. 29, 2004, pp. 1-92.

\* cited by examiner

CONTROLLING HAND-OFF IN A MOBILE NODE WITH TWO MOBILE IP CLIENTS

RELATED APPLICATIONS

The present application claims the benefit of U.S. Provisional Patent Application Ser. No. 60/354,195 filed Feb. 4, 2002 and titled METHOD FOR EXTENDING MOBILE IP TO ENABLE INTEGRATED SUPPORT FOR LOCAL ACCESS AND ROAMING ACCESS CONNECTIVITY, which is hereby expressly incorporated by reference.

FIELD OF THE INVENTION

The present invention is directed to establishing and managing a data communication session and, more particularly, to establishing a data communication session through an access router (AR) in a multi-node network, e.g., a cellular network in which mobile end nodes communicate with each other and other end systems through ARs. ARs are commercially sometimes also known as RadioRouters (RR).

BACKGROUND

Internet Protocol (IP) technology is designed to enable packet-switched interconnection of a heterogeneous set of devices (e.g., computers) and communication networks. A potentially diverse set of network and link layer technologies are interconnected through nodes, e.g., gateways (or routers), that provide a packet forwarding service. Information is transferred between "end nodes" (or hosts) as blocks of data called datagrams, where source and destination hosts are identified by fixed length addresses. Routing in IP internetworks is connectionless in nature, in that datagrams are forwarded by routers on a hop-by-hop basis using the destination address in the datagram.

Mobile IP (MIP) (Ref: IETF RFC 2002, incorporated herein by reference) enables an IP host, also called a "Mobile Node" (MN) in the context of Mobile IP, to dynamically change its point of attachment to the network, yet remain contactable via a previously given "home address". To achieve this, a temporary local address or "care of address" is associated with the MN when it visits a foreign network, the visited network. In some cases the care of address is that of a "foreign agent" that assists in this process, while in other cases the care of address may be directly assigned to the MN. The care of address is registered back on the home network in a node referred to as the "home agent". The home agent intercepts packets destined to the home address of the MN and redirects the packets, by means of encapsulation and tunneling, towards the care of address associated with MN in the visited network. Upon delivery to the care of address, the encapsulation is removed and the original packet destined to the home address is delivered to the MN.

Accordingly, MIP enables a moving Internet host to connect to a Foreign Agent (FA) AR in a visited network, yet still be contactable on its persistent Home Address (HoA) that it uses on its home network and is likely contained in a DNS Domain Name Server system. This is possible because the FA gives the host a temporary local address that is either unique to the host (Co-located Care of Address or CCoA) or is unique to the FA (Care of Address or CoA). In various applications, the FA registers its CoA into the HA for the HoA address of its attached MN. The HA then tunnels packets addressed to the HoA of MN to the Care of Address (CoA) of the FA. The FA forwards packets received from the MN HoA out to the Internet as normal, or reverse tunnels the packets to the Home Agent.

A MIP Local Access (LA) service can be supported in a home domain between the MN and a local home agent (HA) in the local access network, wherein the MN uses a Home Address (HoA) from the local HA as an application address. The MIP client registers the FA CoA received from the AR as a care of address for the HoA into the HA. When the MN changes ARs, then the MN can issue another MIP message to the local HA to update the FA CoA of the MN.

A MIP Remote Access (RA) service can also be supported in a visited domain between the MN and a remote home agent in the home domain of the MN, wherein the MN uses a HoA address from a remote Home Agent (HA) as an application address and an IP address from the AR subnet as an interface address. The MIP client then registers the interface address from the AR as a Co-located Care of Address (CCoA) into the Remote HA for the remote HoA. A remote access hand-off is then required when the MN changes AR because the interface address which is also the CCoA of the MN changes and hence needs to be updated in the remote HA.

A limitation of the above existing model is that it only supports one access type at the time, either remote or local access. According to this present invention, however, a MN may employ both local and remote access at the same time.

In addition, well-known deployed operating systems already have MIP clients deployed that perform remote access using the interface address of the MN, and such clients cannot be assumed to be capable of being modified when a MN also seeks to support local access in a wireless network that by implication must have a MIP client capable of supporting fast hand-offs between ARs.

In addition, there is insufficient MIP signaling defined between the MN and the AR to coordinate both remote and local access hand-offs. Finally, there is no MN internal signaling defined that enables the MN to manage address changes for local and remote access interfaces.

In view of the above discussion, it is apparent that there is a need for supporting enhanced end node mobility, communication session establishment and several other operations related to establishing and maintaining communications sessions in systems which use packets to transmit data.

SUMMARY OF THE INVENTION

Methods and apparatus, and data structures for providing an end node, e.g., a MN, with multiple concurrent services when connected to a local access network are described. The services include a local access service and a remote access service employing two different mobility agent modules (e.g.: MIP client stacks). Various methods, apparatus and data structures of the present invention involve messages and techniques associated with the communication of hand-off information from the AR to the MN, the triggering of appropriate internal messages within the MN, and external MIP hand-off messages back to the AR.

In accordance the present invention information, the AR communicates to the end node (i) the IP address of the AR, (ii) the IP address of its assigned Roaming Node (RN) and (iii) the Roaming Address (RoA) of the end node assigned by said RN. This information is received by the LA MIP client in the end node and used to trigger a range of MIP hand-off messages. The received information is compared to previously received information to detect changes in these addresses. A change in AR results in a MIP message from the LA MIP client to the RN to update it with the new CoA of the AR. A change in RN address results in a LA MIP message to the new RN to obtain a new RoA and to install the FA CoA into that RN. A change in RoA results in a RA MIP message being sent to the remote home agent to register the new RoA as the CCoA of the remote home address of the MN.

To support backwards compatibility with legacy RA MIP clients deployed in popular operating systems, the present invention further defines internal messages and processing within the MN to hide the LA MIP client and the associated local mobility of the MN as it moves between ARs that have been assigned the same RN.

A network implemented in accordance with the present invention may include one or more ARs of the present invention through which end nodes can establish connectivity with a RN and a remote HA, and then conduct communications sessions. End nodes may be, for example, mobile devices which include or are IP hosts.

For purposes of explanation, the end node will sometimes be called an MN. However, it is to be understood that the end node could instead be a fixed node.

The modules included in the ARs and end nodes, may be implemented using software, hardware, or a combination of software and hardware. In the case of software implementations, the modules include different instructions or sets of instructions used to control hardware, e.g., circuitry, to perform each of the different operations performed by the module.

Numerous additional embodiments, features, and advantages of the methods, apparatus and data structures of the present invention are discussed in the detailed description that follows.

DETAILED DESCRIPTION

Figure 1:
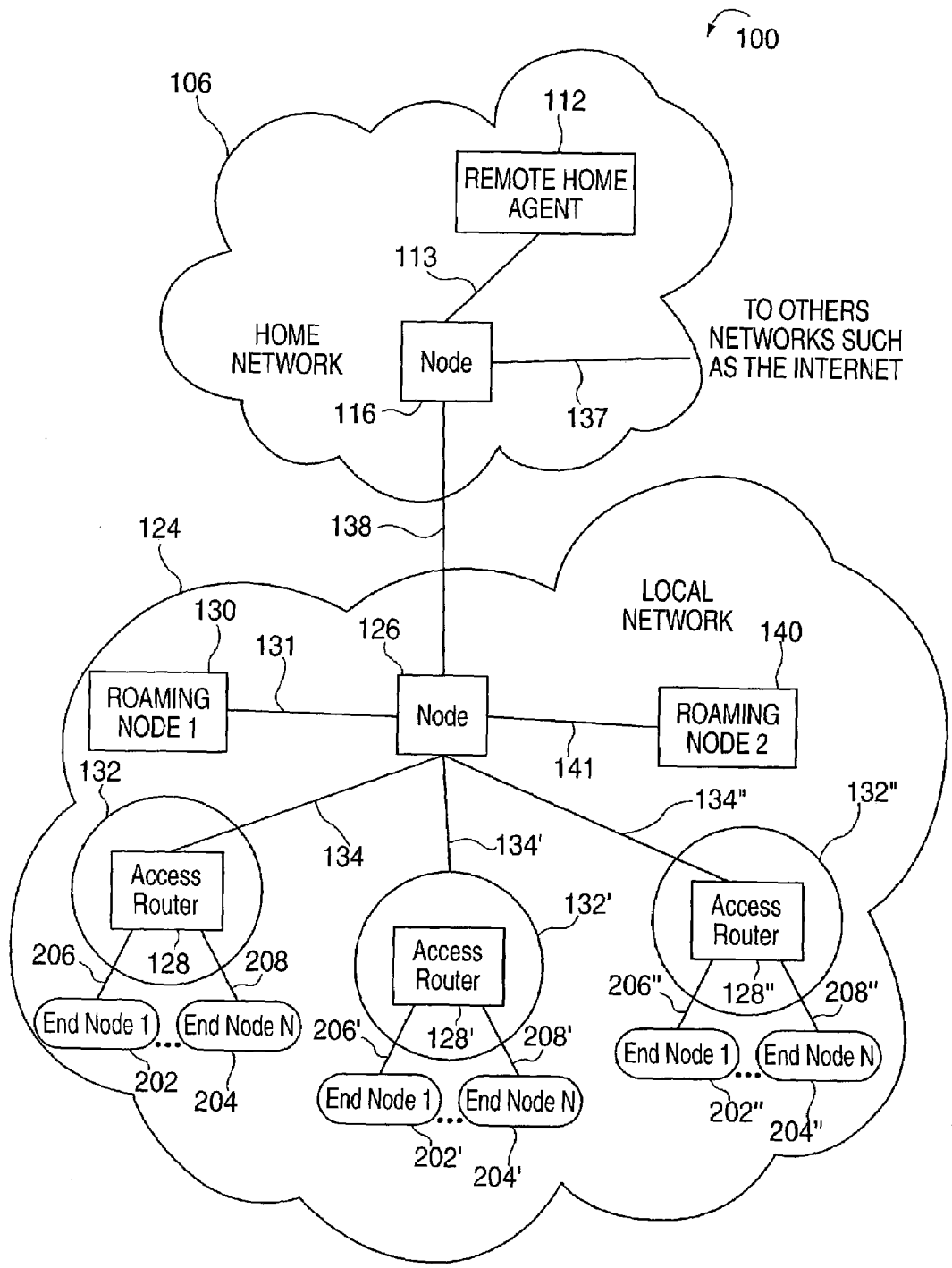
FIG. 1 illustrates an exemplary communications system including two networks 106, 124 in which the present invention can be used.

FIG. 1 illustrates an exemplary system 100 in which the invention is implemented. In FIG. 1, system 100 includes a home network 106, and a local network 124. Without loss of generality, the home and local networks are shown in the same network domain, but can be located in different network domains located in different parts of the Internet. The home network 106 includes a home agent (HA) 112 and a network node 116. Network node 116 is coupled to HA 112 via link 113 and to the node 126 in the local network 124 via link 138, and may be coupled to other nodes (e.g., to the rest of the Internet including other home and local access networks) via link 137.

The local network 124 includes a network node 126, a plurality of access routers (ARs) 128, 128', 128", a Roaming Node 1 (RN1) 130 and a Roaming Node 2 (RN2) 140. Each access router 128, 128', 128" is located within a communication cell 132, 132', 132" respectively. Each communication cell 132, 132', 132" represents the coverage area of corresponding access router 128, 128', 128", respectively. Network node 126 is coupled to AR 128, AR 128', AR 128", RN1 130 and RN2 140 via links 134, 134', 134", 131 and 141, respectively. Network node 126 is further coupled to node 116 of the home network 106 by link 138. The main elements of cells 132, 132' and 132" and their respective ARs are identical and only the main elements of cell 132 will be described. Equivalent elements in cells 132' and 132" are numbered as for cell 132 with the addition of ' or ".

The AR 128 is coupled to a plurality of End Nodes 1 through End Node N, of which only End Nodes 1 202 and End Node N 204 are shown. These are coupled to AR 128 via bidirectional links 206 and 208 respectively. The links 206,208 may be fixed or wireless links. In the case of wireless links the end nodes 1 202 and N 204 and the AR 128 will include wireless transmitter and receiver circuitry.

Figure 2:
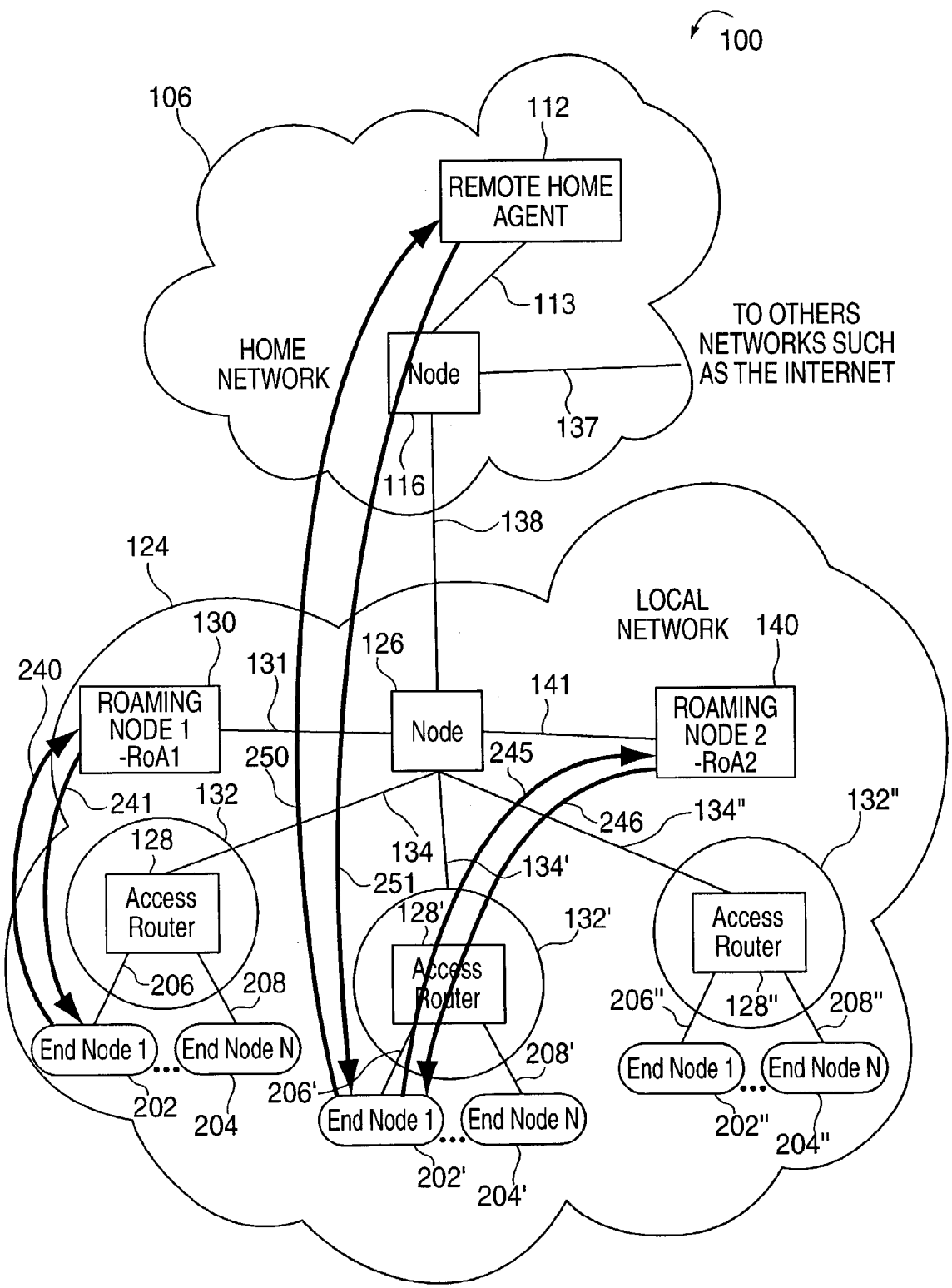
FIG. 2 is another illustration of the two networks of FIG. 1 with various exemplary hand-off signals.

FIG. 2 shows some exemplary hand-off signals that may be used by components associated with the system 100 of FIG. 1. Each AR 128, 128' and AR 128" is assigned one of either RN1 130 or RN2 140 to support the local mobility of the end nodes at that AR. Multiple RNs may be required in a local access network 124 for scaling, performance and reliability. Therefore AR 128 may be assigned to RN1 130 while ARs 128', 128" may be assigned to RN2 140. As shown, End Node 1 202 at AR 128 then requests a Roaming Address (RoA1) from RN1 130 to use as an interface address using a LA MIP Request message 240, and obtains the Roaming Address (RoA1) in a LA MIP Reply message 241. The RoA1 will remain valid while the End Node 1 202 remains at AR 128. Similarly, an End Node 1 202' at AR 128' requests and obtains a Roaming Address RoA2 from RN2 140 to use as an interface address using messages 245 and 246, respectively. Note that, although not shown for simplicity, messages 240, 241, 245 and 246 and forwarded via the AR to which the End Node is attached.

RoA2 will remain valid while the End Node 1 202 remains at AR 128' or AR 128" by the End Node updating the CoA in RN2 140 for the Roaming Address with the address of either AR 128' or AR 128". This is accomplished using message 245 and 246 via that AR, reporting the CoA of said AR. Only when the End Node 1 202' moves to AR 128 will a change in RN be required, from RN 2 140 to RN1 130. This will invalidate the Roaming address RoA2 from RN 2 at the End Node 1 202' and hence force the End Node 1 202' to obtain a new Roaming Address RoA1 from RN 1 130 to act as an interface address using messages corresponding to those 240, 241 used by End Node 1 202.

Although not shown in FIG. 2, End Node 1 202' is coupled with AR 128 rather than AR 128' in the following. The End Node 1 202' might also have registered the RoA2 from RN 2 140 into the remote Home Agent 112 in network 106, as the CCoA for the remote Home Address (from remote Home Agent 112) of the End Node 1 202'. Therefore, when the RN changes from RN 1 130 to RN 2 140, this forces an RoA change from RoA2 to say RoA1. Consequently, the End Node 1 202' must send a RA MIP Registration Request message 250 to the remote Home Agent 112 to update the CCoA for the remote HoA to be RoA1 from RN 1 130. The RA MIP reply message 251 is returned to the End Node 1 202' to report any errors encountered. Messages 250, 251 and may be sent directly between the End Node 1 202' and the remote Home Agent 112 or maybe forwarded via the AR 128 and/or even the RN 1 130.

The End Node 1 202' therefore needs to be able to acquire an RoA1 from an RN 1 130, to update the FA CoA from the local AR 128, 128', 128" when moving between ARs, acquire a new RN 2 and RoA2 when the new AR 128' advertises an RN 2 address not equal to the existing RN 1 address, and finally update any remote Home Agents 112 with the new CCoA=RoA2 of the End Node when the RoA changes from RoA1 that was previously registered into the HA 112.

The End Node therefore needs to be able to detect changes in AR, RN and RoA and also needs to be able to support a LA MIP client and a RA MIP client at the same time, even if the RA MIP client is a legacy client that has no support for a collocated LA MIP client. The AR 128 hence needs to be able to provide information to the End Node to assist with hand-off and to support the multiple MIP signals sent from and to said End Node.

Figure 3:
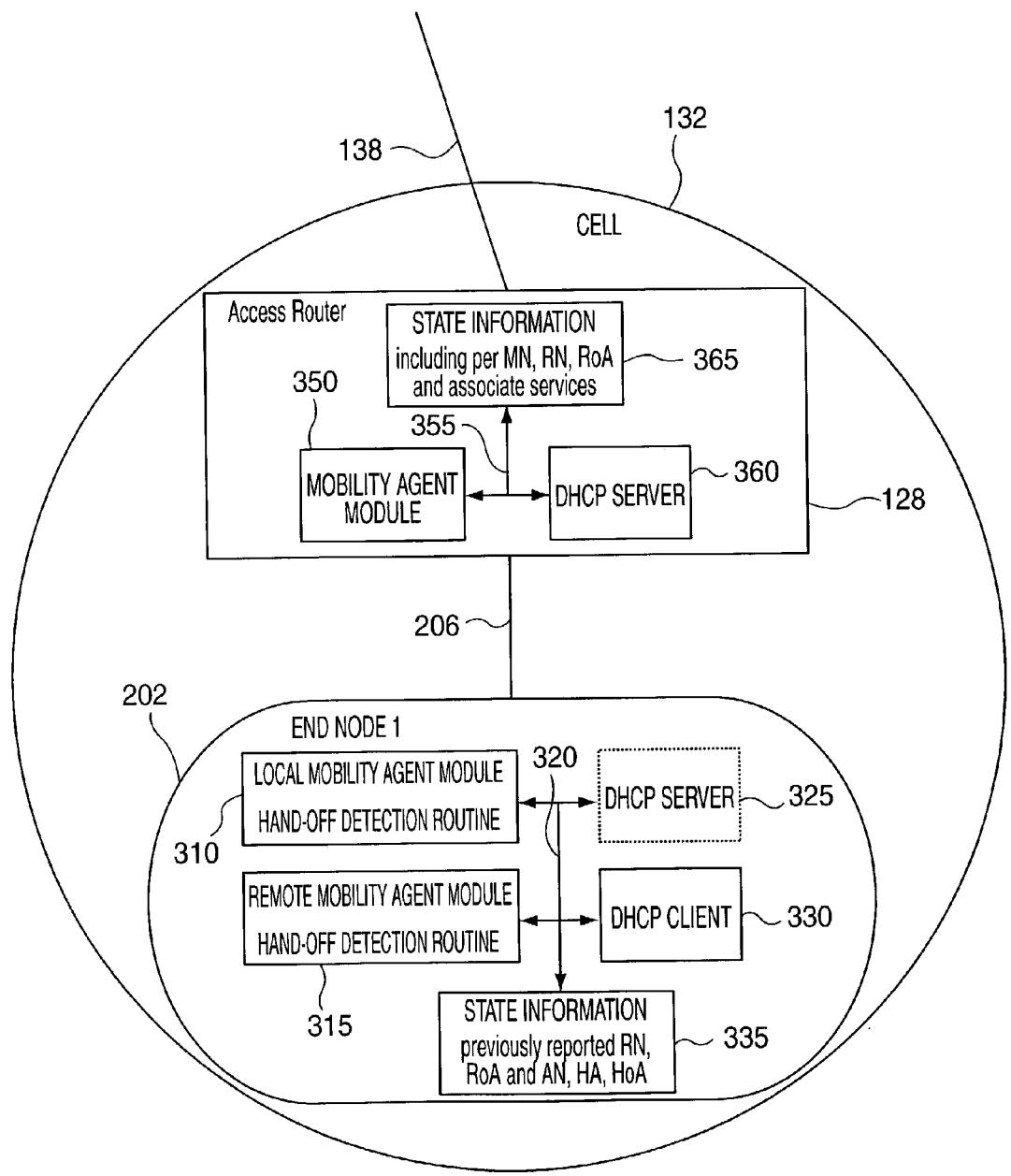
FIG. 3 illustrates an exemplary embodiment of an access router and an end node in the system of FIGS. 1 and 2.

FIG. 3 further illustrates the AR 128 and the End Node 1 202 in FIGS. 1 and 2, located in cell 132. Connectivity via link 138, between AR 128 and remote network 106, is shown but all other intervening elements of FIG. 1 are omitted for simplicity End Node or MN 1 includes a local Mobility agent module 310, a remote mobility agent module 315, an optional Dynamic Host Configuration Protocol (DHCP) server 325, a DHCP client 330, state information 335 and a set of arrows 320 which is used to represent the exchange of data, information, and/or signals between the depicted elements. State information 335 includes, e.g., parameters, communication session and/or end node status information, security information, and/or other information relating to end node interaction, and/or communication with an AR, and/or another device such as an RN and an HA. The status information specifically includes hand-off information previously advertised from AR 128 and the addresses RoA1, RN1, remote HA, remote HoA. Note that according to this present invention the remote HoA and the RoA can both be used for remote and local services, respectively.

The local mobility agent module 310 manages MIP LA messaging, such as messages 240 and 241, that is used to configure and maintain the routability of the RoA1 from RN 1. It specifically includes a hand-off detection routine and various signaling routines for managing LA hand-off within End Node 1 202 as will be described with reference to FIGS. 4-6. The remote mobility agent module 315 manages signals 250 and 251 used to configure and maintain the routability of the HoA from the remote HA 112. It specifically includes a hand-off detection routine and associated routines used to manage RA hand-off within the End Node 1 202. The DHCP Client 330 is used to acquire each new interface address for the End Node 1 202 to be used by the remote mobility module 315 as a CCoA. DHCP Server 325 may be used to provide the interface address to the DHCP client 330 when the interface address is the RoA1, and is delivered to the local mobility agent module 310 in MIP message 241. DHCP client 330 can alternatively acquire the RoA1 from a DHCP server 360 in AR 128, with the mobility agent module 350 inserting the RoA1 into the DHCP server 360 when received as part of message 241. Mobility agent module 350 is able to process message 241 because message 241 passes through AR 128 in transit from RN 130 to EN 202 as shown in FIG. 2.

Access router 128 includes a mobility agent module 350, a DHCP server 360, state information 365 and a set of arrows 355, which is used to represent the exchange of data, information, and/or signals between the depicted elements. State information 365 includes, e.g., parameters, communication session and/or end node status information, security information, and/or other information relating to end node interaction and/or communication with an End node and/or another device such as a RN or a HA. It specifically includes the assigned RN to each AR along with MIP visitor list state extended to support two MIP clients in the End Node 1 202. The Mobility Agent Module 350 supports the operation of both LA and RA MIP services and the hand-off of End Nodes using said services to other ARs 128', 128" and between RNs 130 and 140. It also supports the insertion of the RoA from message 241 into the DHCP server 360 as mentioned previously.

While shown as software modules in the FIG. 3 implementation, one or more of the modules 310, 315, 325, 330, 350 and 360, and sub-modules included therein, can be implemented using hardware, software, or a combination of software and hardware. For purposes of the invention described herein, references to modules or sub-modules are to be understood as software, hardware, or a combination of software and hardware that performs the functions of the described module or sub-module. State information 335 and 365 may be stored on any type of memory and/or storage medium.

Figure 4:
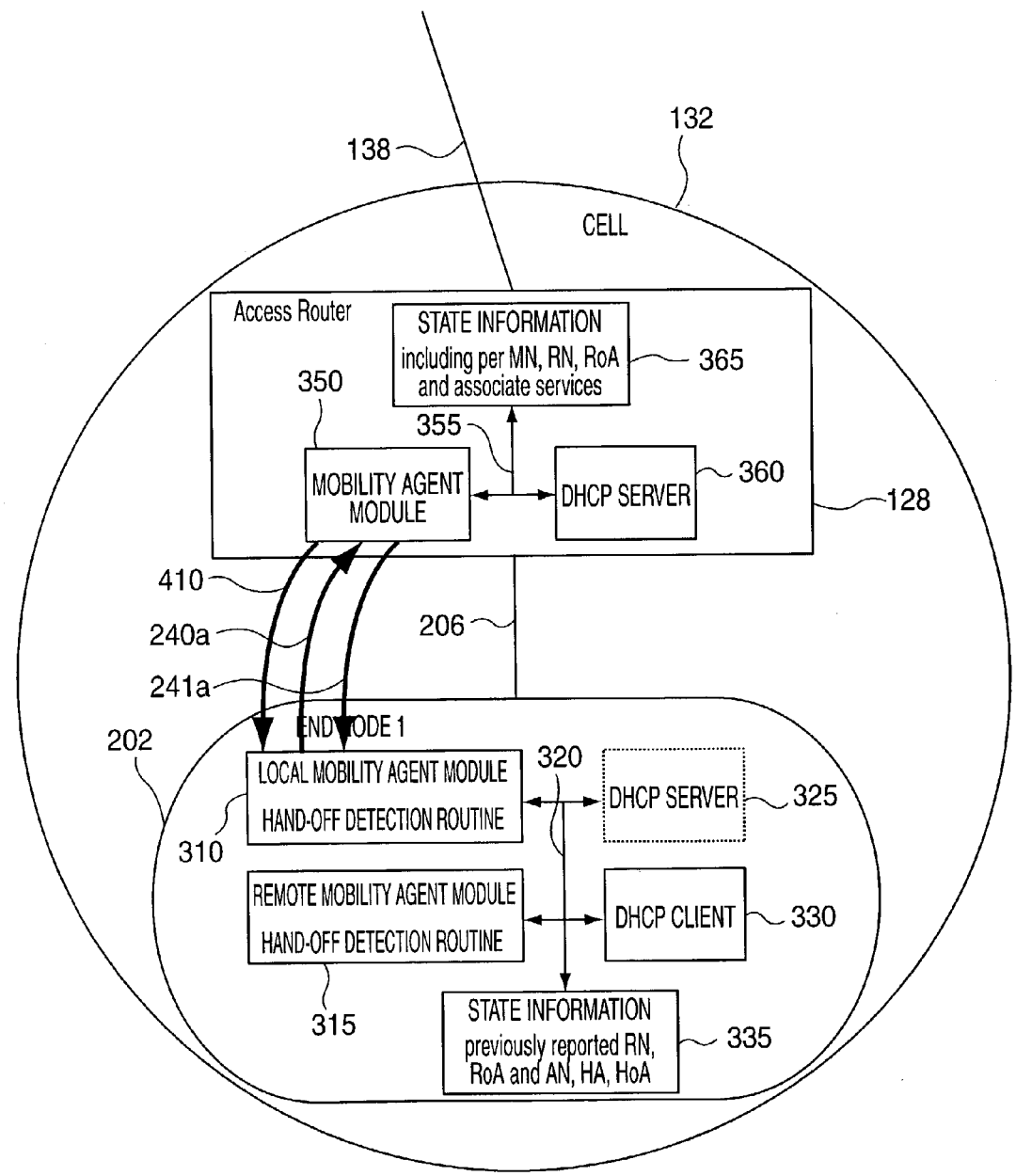
FIG. 4 illustrates an exemplary message exchange between and end node and the access router of FIG. 3 during an MN hand-off in which the RN address does not change.
Figure 5:
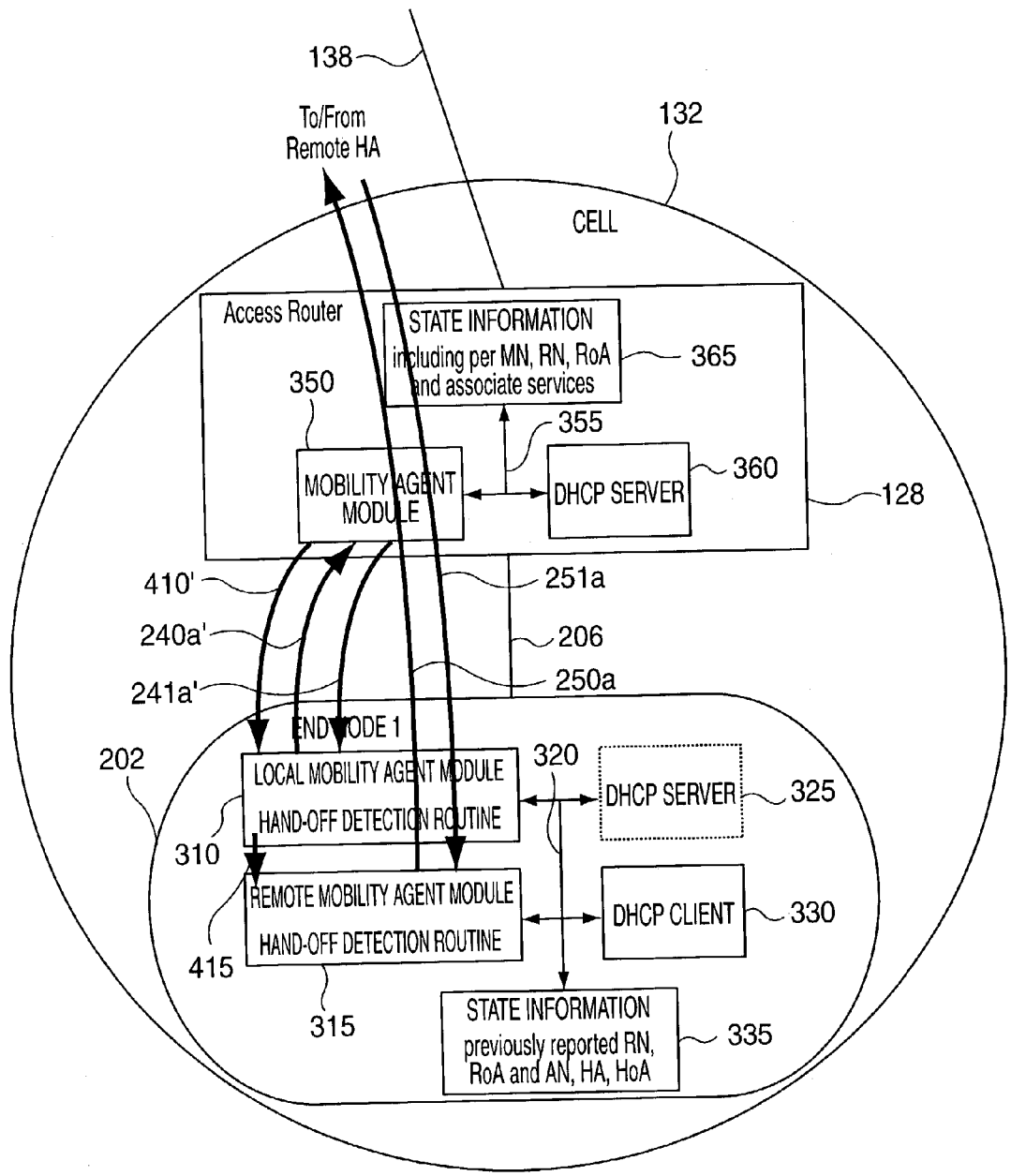
FIG. 5 illustrates an exemplary message exchange between the end node and the access router of FIG. 3, and an exemplary message exchange between the end node and the Remote Home Agent during an MN hand-off in which the RN address does change.
Figure 6:
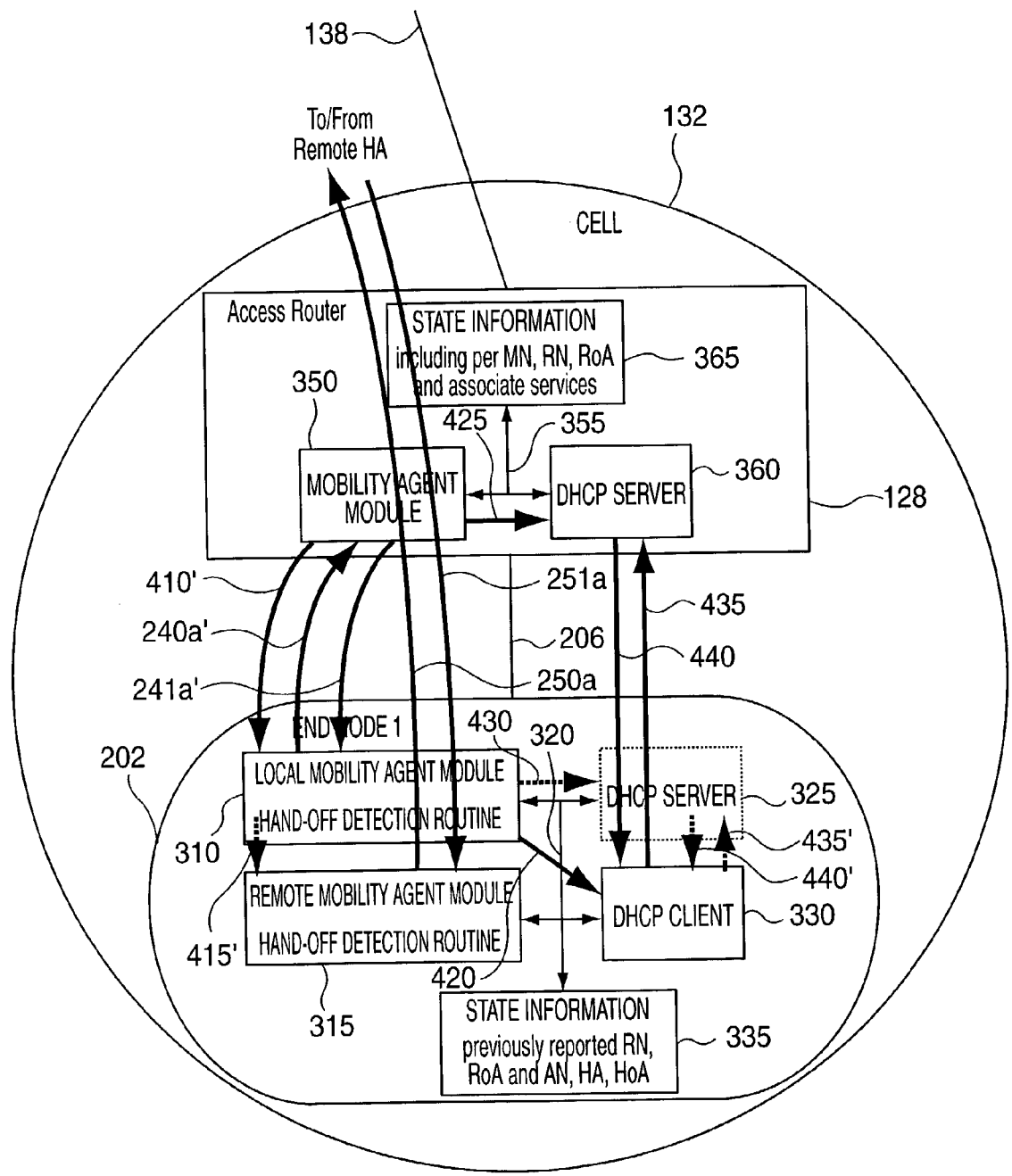
FIG. 6 illustrates alternative message exchanges to that of FIG. 5 when the remote mobility module in the end node is not aware of the local mobility module in the same end node.

FIGS. 4-6 show an exemplary sequence of signals used to enable an end node 1 202, which may be for example a mobile node (MN) 202, to manage hand-off and associated addressing functions in different embodiments supported by this invention. Only internal and external messages that are useful for the description of the invention are shown and, in particular, the general internal messaging supported by 320 and 355 are not further discussed. Since the HAs and RNs of FIG. 2 have been omitted from FIGS. 4-6, all signaling destined to, or originating from, the omitted elements is described below but not explicitly illustrated. All such signaling is however compliant with equivalent signaling already described with reference to FIG. 2. For example, the messages 240a,241a and 240a',241a' in FIGS. 4-6 are merely the end node-to-AR portions of the end node-to-RN messages 240,241 of FIG. 2.

FIG. 4 depicts one embodiment of this invention in which MN 202 is being handed off to Access Router 128. In this embodiment AR 128 is associated with the same RN (e.g.: RN 1 130 of FIG. 2) to which the MN 202 was last registered. Message 410 is an advertisement from the AR 128 to the MN 202 of the assigned RN (RN 1 130 in FIG. 2) for that AR, along with the address of the AR 128. In an alternative embodiment message 410 also includes indications of the MIP capabilities of the AR 128. This is received by module 310 in MN 202 where the hand-off detection routine compares the AR and RN addresses to the last values previously received. In this embodiment of the invention only the AR address has changed in which case then local mobility module 310 undertakes a local access hand-off by sending message 240a to the AR 128 to cause the FA CoA in the RN 1 to be updated to that of the new AR address (i.e., the address of AR 128). Following standard registration signaling between AR 128 and the RN (RN 1 130 in FIG. 2), AR 128 returns message 241a confirming successful registration. In this embodiment the RN address was not changed and thus the remote mobility agent module 315 in MN 202 is not involved and is not notified of any change. Applications using the current RoA and HoA addresses are not affected by this type of hand-off.

In the FIG. 5 embodiment, MN 202 is being handed off to Access Router 128, but this time AR 128 is associated with a new RN (e.g., RN 1 130 of FIG. 2), while MN 202 was last registered with another RN (e.g., RN 2 140 of FIG. 2). Message 410', as with message 410 in FIG. 4, is an advertisement from the AR 128 to the MN 202 of the assigned RN (RN 1 130 in FIG. 2) for that AR, along with the address of the AR 128. This is received by module 310 in MN 202 where the hand-off detection routine compares the AR and RN addresses to the last values previously received. In this embodiment both the AR address and the RN address have changed from the last values. In this embodiment the RoA2 address of MN 202, currently allocated by RN 2 140 of FIG. 2 is first changed to the RoA1 address allocated by the new RN 1 130 of FIG. 2. To that end, MN 202 sends message 240a', which is similar to corresponding message 240a of FIG. 4, but MN 202 now requests a new RoA (e.g., by setting it to zero). AR 128 undertakes standard registration signaling with RN 1 130 of FIG. 2 to allocate new RoA (RoA1) for MN 1 202 and to configure RN 1 130 with the FA CoA of AR 128. AR 128 returns a message 241a' to MN 202 indicating successful registration and the new RoA1.

At this point the remote mobility agent module 325 of MN 202 should get involved to register the new RoA with the HA (e.g., Remote HA 112 of FIG. 1) of the same module.

FIG. 5 depicts one embodiment of this invention in which the Local and the Remote mobility agent modules 310, 315 of MN 202 are aware of each other and can share and/or exchange messages and data. In this embodiment of the invention the new RN (RN 1 130 of FIG. 2) and RoA (RoA1) address are sent directly to the remote access module 315 using message 415. In an alternative embodiment of this invention message 415 is an extended version of message 410. In another alternative embodiment of this invention the state included in message 415 is instead communicated via the shared state information 335.

In either embodiment, the reception of message 415 (or its corresponding state) causes the remote mobility module 315 to send message 250a to its HA (e.g., Remote HA 112 of FIG. 2) to update it with the new RoA1 address as the MN CCoA. The Remote HA 112 of FIG. 2 returns message 251a to MN 202 to indicate successful registration.

Applications using RoA addresses will have to accommodate the address change or stop operating. Applications using HoA addresses do not get affected by this type of hand-off FIG. 6 depicts an alternative embodiment to FIG. 5 in which Local and the Remote mobility agent modules 310, 315 of MN 202 are not aware of each other and they do not share and/or exchange messages and data. In this embodiment the processing and content of messages 410', 240a' and 241a' are identical to that of FIG. 5. Following allocation of the new RoA1 to MN 202 and registration of the AR 128 address as a FA CoA to RN 1 130 of FIG. 2 as in FIG. 5, this embodiment of the invention continues in the following way. The newly allocated RoA is provided to the MN-specific DHCP server 360 of AR 128 with message 425, where it is stored. Trigger 420 is then sent to notify the DHCP client 330 in MN 202 that a new address should be requested. In one embodiment of this invention message 420 is implemented by sending a media down signal followed by a media up signal. On reception of message 420 the DHCP client 330 sends a standard DHCP Request message 435 which is received by DHCP Server 360. In response, the DHCP Server 360 returns the allocated RoA1 in a DHCP Offer message 440.

In an alternative embodiment, the optional DHCP server 325 in MN 202 is used instead of the DHCP Server 360, in which case message 430 provides RoA1 to said DHCP Server 325. In this case DHCP Request message 435 (also shown as message 435' in FIG. 6 for clarity) is intercepted by DHCP Server 325 which returns RoA1 in message 440'.

In either case remote mobility agent module 315 according to this invention is reacting to a change of RoA in DHCP client 330 and sends message 250a and receives reply 251a, which are identical to the corresponding messages in FIG. 5.

In an alternative embodiment of this invention local mobility agent module 310 also sends message 415' to the remote mobility agent module 315 following the new RoA allocation by message 241a'. Since the remote access module 315 is a legacy module not aware of local mobility module 310, the message 415' can only include standard remote access MIP fields such as the identify of the RN and the flag used to ask the remote mobility agent module 315 to send message 250 via that RN rather than directly to the remote home agent. Effectively this means that the RN will appear to be the Foreign Agent to the remote access mobility module 315. Therefore, the local mobility agent module 310 must make it look like the message 415 was actually sent by the RN 1 130 rather than the AR 218.

The various messages in FIGS. 4–6 enable the MN to support concurrent local and remote access, and to control hand-offs between ARs and RNs based on information passed from the AR 128 and distributed between modules within the MN. This is can be achieved even with a legacy remote mobility module 315 that does not support rapid wireless hand-offs or RNs, due to the actions of the local mobility module 310.

Numerous variations on the above described inventions will be apparent to those of ordinary skill in the art based on the above description. Such variations are to be considered within the scope of the invention.

What is claimed is:

1. A method of operating a mobile node from a home network while visiting a local network, the mobile node including a local mobility agent module and a remote mobility agent module to interoperate with a communications network including a plurality of access nodes and a plurality of roaming nodes, a set including multiple access nodes being associated with at least one of said roaming nodes in said communications network, different ones of said access nodes being associated with different roaming nodes, the method comprising:

operating said local mobility agent module to handle a handoff between two of said access nodes in said visited local network, said two of said access nodes including a first access node and a second access node; and operating said remote mobility agent module to handle handoff between two of said roaming nodes in said visited local network, said two of said roaming nodes including a first roaming node and a second roaming node located in said visited local network.

2. The method of claim 1, further comprising:

operating said local mobility agent module to communicate information from said local mobility agent module indicating assignment of a new roaming address to said remote mobility agent module, said information indicating assignment of a new roaming address to said mobile node.

3. The method of claim 2, wherein said new roaming address is assigned in response to a roaming node handoff, the method further comprising:
operating said remote mobility agent module to send registration information to a remote home agent to bind a home address associated with said end node to said new roaming address.

4. The method of claim 3,
wherein said mobile node further comprises an interface between said local mobility agent module and said remote mobility agent module; and
wherein said step of communicating information includes resetting said interface.

5. The method of claim 3, wherein said step of communicating information includes transmitting said new roaming address from said local mobility agent module to said remote mobility agent module.

6. The method of claim 2, further comprising:
receiving from one of said two access nodes, handoff information used to control handoff procedures at said mobile node, said handoff information including the address of a roaming node associated with one of said two access node.

7. The method of claim 6, wherein said step of communicating information includes transmitting a modified version of said handoff information received from one of said two access nodes from said local mobility agent module to said remote mobility agent module.

8. The method of claim 2, wherein said step of operating said local mobility agent module to handle a handoff includes:
operating said local mobility agent module to receive mobile node handoff information from at least one of said first and second access nodes, said mobile node handoff information including the address of at least one roaming node assigned to said second access node.

9. The method of claim 6, further comprising:
comparing at least some of said received handoff information to previously received information to determine whether there has been a change in a roaming node associated with an access node used to couple said mobile device to said communications network.

10. The method of claim 9, further comprising:
operating the local mobility agent module in said mobile node to send a registration message to the roaming node, associated with said access node, to request a new roaming node address, said registration message being sent in response to determining that here has been a change in a roaming node associated with an access node used to couple said mobile device to said communications network.

11. A method of operating a mobile node including a local mobility agent module and a remote mobility agent module to interoperate with a communications network including a plurality of access nodes and a plurality of roaming nodes, a set including multiple access nodes being associated with at least one of said roaming nodes in said communications network, different ones of said access nodes being associated with different roaming nodes, the method comprising:
operating said local mobility agent module to handle a handoff between two of said access nodes, said two of said access nodes including a first access node and a second access node;
operating said remote mobility agent module to handle handoff between two of said roaming nodes, said two of said roaming nodes including a first roaming node and a second roaming node
operating said local mobility agent module to communicate information from said local mobility agent module indicating assignment of a new roaming address to said remote mobility agent module, said information indicating assignment of a new roaming address to said mobile node;
receiving from one of said two access nodes handoff information used to control handoff procedures at said mobile node, said handoff information including the address of a roaming node associated with one of said two access node; and
wherein said communications network further includes a DHCP server coupled to said access nodes, said mobile node further including a DHCP client module, the method further comprising:
operating the DHCP client module to configure said interface.

12. The method of claim 11, wherein operating the DHCP server client module to configure said interface includes:
transmitting a DHCP message to said DHCP server;
receiving the new roaming address in a DHCP message from said DHCP server; and
using the new roaming address as an interface address for a second mobile IP client included in said mobile node.

13. The method of claim 12, further comprising, prior to operating said DHCP client module to configure said interface,
loading the DHCP server module with the new roaming address.

14. The method of claim 3, wherein the local and remote mobility agent modules each include:
at least one mobile IP client.

15. The method of claim 1, wherein said access nodes are access routers.

16. The method of claim 15, wherein said roaming nodes are network nodes coupled to said access routers.

17. The method of claim 15, wherein said communications network includes more access routers than roaming nodes.

18. A method of operating a mobile node including a local mobility agent module and a remote mobility agent module to interoperate with a communications network including a plurality of access nodes and a plurality or roaming nodes, a set including multiple access nodes being associated with at least one of said roaming nodes in said communications network, different ones of said access nodes being associated with different roaming nodes, the method comprising:
operating said local mobility agent module to handle a handoff between two of said access nodes, said two of said access nodes including a first access node and a second access node;
operating said remote mobility agent module to handle handoff between two of said roaming nodes, said two of said roaming nodes including a first roaming node and a second roaming node
operating said local mobility agent module to communicate information from said local mobility agent module indicating assignment of a new roaming address to said remote mobility agent module, said information indicating assignment of a new roaming address to said mobile node;
receiving from one of said two access nodes, handoff information used to control handoff procedures at said mobile node, said handoff information including the address of a roaming node associated with one of said two access node, said handoff information being transmitted in a mobile IP foreign agent advertisement message.

19. A communications system comprising:
a local communications network including a plurality of access nodes and a plurality of roaming nodes, a set of access nodes including multiple access nodes being associated with at least one of said roaming nodes in said local communications network, different ones of said access nodes being associated with different roaming nodes;
a mobile node from a home network being coupled to one of said access nodes in said local communications network, said local communications network being a visited local network, the mobile node including:
a local mobility agent module including means for handling a handoff between two of said access nodes in said visited local network; and
a remote mobility agent module including means for handling a handoff between two of said roaming nodes in said visited local network.

20. The communication system of claim 1, wherein the local and remote mobility agent modules each include, internal to said mobile node:
at least one mobile IP client.

* * * * *